(12) United States Patent
Laignel et al.

(10) Patent No.: US 9,212,265 B2
(45) Date of Patent: Dec. 15, 2015

(54) MASTER MIXTURE COMPOSITION INCLUDING A PEROXIDE

(75) Inventors: Anne-Yvonne Laignel, La Chapelle Gautier (FR); Catherine Corfias-Zuccalli, Pont-Audemer (FR); Laurent Keromnes, Chaponost (FR)

(73) Assignee: Arkema France, Colombes (FR)

( * ) Notice: Subject to any disclaimer, the term of this patent is extended or adjusted under 35 U.S.C. 154(b) by 902 days.

(21) Appl. No.: 13/378,567

(22) PCT Filed: Jun. 15, 2010

(86) PCT No.: PCT/FR2010/051188
§ 371 (c)(1),
(2), (4) Date: Jan. 19, 2012

(87) PCT Pub. No.: WO2010/146300
PCT Pub. Date: Dec. 23, 2010

(65) Prior Publication Data
US 2012/0108758 A1    May 3, 2012

(30) Foreign Application Priority Data

Jun. 15, 2009 (FR) ...................... 09 53978

(51) Int. Cl.
*C08F 210/02* (2006.01)
*C08J 3/205* (2006.01)
*C08J 3/22* (2006.01)
*C08J 3/24* (2006.01)
*C08K 5/14* (2006.01)

(52) U.S. Cl.
CPC ............... *C08J 3/2053* (2013.01); *C08J 3/226* (2013.01); *C08J 3/24* (2013.01); *C08K 5/14* (2013.01); *C08J 2323/08* (2013.01); *C08J 2423/08* (2013.01)

(58) Field of Classification Search
CPC .............. C08J 3/2053; C08J 3/24; C08K 5/14
USPC ........................................................ 525/222
See application file for complete search history.

(56) References Cited

U.S. PATENT DOCUMENTS

| | | | |
|---|---|---|---|
| 3,594,342 A | 7/1971 | Ratzsch et al. | |
| 4,342,844 A | 8/1982 | Torenbeek et al. | |
| 4,528,155 A * | 7/1985 | Elder | ....................... 264/171.19 |
| 4,617,366 A | 10/1986 | Gloriod et al. | |
| 4,644,044 A | 2/1987 | Gloriod et al. | |
| 5,589,526 A | 12/1996 | Sienel et al. | |
| 8,350,147 B2 | 1/2013 | Nishijima et al. | |
| 2008/0176994 A1* | 7/2008 | Allermann et al. | ........... 524/563 |
| 2010/0229944 A1 | 9/2010 | Nishijima et al. | |

FOREIGN PATENT DOCUMENTS

| | | |
|---|---|---|
| DE | 3049272 | 11/1981 |
| GB | 2 091 745 A | 8/1982 |
| JP | 04 296330 | * 10/1992 |
| WO | WO2006/085603 | 8/2006 |

OTHER PUBLICATIONS

Translation of JP 04-296330.*
Translation of JP 04-296330 (Nov. 1992).*

* cited by examiner

*Primary Examiner* — Doris Lee
(74) *Attorney, Agent, or Firm* — RatnerPrestia

(57) ABSTRACT

The invention relates to a transparent master mixture that includes an ethylene copolymer and an ethylene monomer having a polar function (a) and a peroxide (b), characterized in that said composition includes, by weight, from 5 to 30% of (b); from 70 to 95% of (a); and in that the copolymer (a) includes from 20 to 45 wt % of ethylene monomer having a polar function. The invention also relates to a method for producing a master mixture composition including an organic peroxide. The method makes it possible to produce a composition useful for cross-linking of polymers.

10 Claims, No Drawings

MASTER MIXTURE COMPOSITION INCLUDING A PEROXIDE

FIELD OF THE INVENTION

A subject matter of the invention is a thermoplastic composition comprising an organic peroxide, its process of manufacture and the use of this composition for crossing polymers.

STATE OF THE ART

Organic peroxides are commonly used for the crosslinking of thermoplastic resins or elastomers, these resins and elastomers being grouped together in the present description under the term "polymers". In order to crosslink a polymer, a peroxide is generally blended with the polymer to be crosslinked in a first stage, then a second stage of shaping the polymer is carried out and then a third stage of crosslinking is carried out, for example by a heat treatment.

At ambient temperature, the peroxides can be in the liquid or solid form. When the peroxides are blended with these polymers, they are blended at high temperature, that is to say a temperature greater than the softening point of the polymer, for example by extrusion or kneading; the peroxides are then generally in a liquid form.

A first problem is that the peroxides in this liquid form are difficult to blend with the polymer and a phenomenon of demixing of the peroxide may be observed.

Furthermore, a long blending time at high temperature is necessary in order to allow the peroxide to blend into the polymer. A phenomenon of crosslinking may then be observed from this stage, that is to say a premature crosslinking of the polymer before it is shaped. In order to limit these problems, the peroxide in the liquid form can be incorporated at ambient temperature beforehand in porous fillers, such as silica or talc. However, when these porous fillers carrying the peroxide are blended with the polymer, they are difficult to uniformly and rapidly distribute in the polymer; the use of these porous fillers can also reduce some properties of the polymer, such as, for example, its transparency.

In order to facilitate the blending of the peroxides with the polymer to be crosslinked, use may also be made of compositions comprising an additional polymer and peroxides at a high concentration, well known to the person skilled in the art under the name of "masterbatch".

U.S. Pat. No. 5,589,526 describes, for example, a masterbatch comprising an elastomeric polymer, such as the copolymer of ethylene and vinyl acetate, from 30 to 50% by weight of the composition of an organic peroxide, a plasticizer, a polyoctenamer and fillers. The masterbatch described is manufactured by a mixer for the thermoplastics by melting the polymers with the plasticizer and by adding the peroxide and then the fillers. The manufacturing process is lengthy and complex: as a phenomenon of self-heating of the composition is observed when this type of melt processing is used, it is therefore necessary to confirm that the temperature remains stable and is sufficiently low for premature crosslinking not to take place. Furthermore, the presence of plasticizer is necessary in order to reduce the self-heating, which may be a nuisance in some applications. Finally, the presence of large amounts of fillers, such as chalk and silicic acid, and polyoctenamer, which is a highly crystalline polymer, render the masterbatch opaque.

A description is given, in U.S. Pat. No. 3,594,342, of a process for the manufacture of crosslinked polyethylene in which an oligomer of a copolymer of ethylene and vinyl acetate or of a copolymer of ethylene and acrylic ester, having a low content of acetate or acrylic ester, is blended with a peroxide in order to form a masterbatch, which is subsequently blended with a polyethylene in the molten state. The masterbatch is manufactured in the molten state and problems of premature crosslinking may appear.

The document DL 3049272 A1 describes masterbatches comprising organic peroxides, these masterbatches being of use in the manufacture of partially crosslinked thermoplastic elastomers. These elastomers are of particular use in the manufacture of automobile or electrical parts or shoes. This masterbatch comprises an olefin copolymer, such as an ethylene/propylene copolymer, and a polyolefin resin having a high crystallinity. This masterbatch is manufactured by suspending the granules in an aqueous solution. Among the examples, example 4 describes a masterbatch comprising mainly an ethylene/propylene copolymer and, in smaller proportions, an ethylene/vinyl acetate copolymer which comprises 20% by weight of vinyl acetate. This masterbatch is not transparent. Furthermore, despite the drying, relatively high amounts of water may be present in the masterbatch.

The U.S. Pat. No. 4,342,844 describes a process for the manufacture of a masterbatch comprising from 20 to 60% by weight of peroxides. It comprises a first stage in which particles of polymer of any type are brought into contact at a temperature of 15 to 95° C. with an organic peroxide in the liquid form or with an unstable emulsion of peroxide and of solvent, in order to incorporate the peroxide in the particles, these polymer particles being completely surrounded by the liquid medium after being brought into contact, the particles being separated from the liquid medium in a second stage.

This manufacturing process makes it possible to limit the phenomenon of premature crosslinking. However, it exhibits the disadvantage of having to separate the particles from the liquid medium and having to dry said particles, which lengthens the process for the manufacture of the masterbatch. Examples 8 and 9 describe masterbatches manufactured from a copolymer of ethylene and vinyl acetate comprising a low content by weight of vinyl acetate far below 20% by weight. The amount of peroxide in the masterbatch thus obtained is in the order of 40% by weight. Furthermore, despite the drying, relatively high amounts of water may be present in the masterbatch. The masterbatch obtained is not very transparent. Furthermore, no indication is given of the transparency of the polymers crosslinked by these masterbatches.

There thus exists a need to find novel transparent masterbatches which can be easily handled and stored and which make it possible to crosslink polymers while retaining the transparency of these polymers. It is also necessary to find an advantageous process for the manufacture of masterbatches in which the phenomenon of premature crosslinking is limited and which can be manufactured by a new easy manufacturing process.

SUMMARY OF THE INVENTION

A preferred subject matter of the invention is a transparent composition, of use as masterbatch, comprising a copolymer of ethylene and of an ethylenic monomer carrying a polar functional group (a) and a peroxide (b), characterized in that said composition comprises, by weight:
 from 5 to 30% of (b), preferably from 7 to 16%;
 from 70 to 95% of (a), preferably from 84 to 93%;
and in that the copolymer (a) comprises from 20 to 45% by weight of ethylenic monomer carrying a polar functional group, preferably from 25 to 35% by weight.

The composition (I) according to the invention can be used for the crosslinking of a polymer. It exhibits in particular the advantage of being more transparent than the masterbatches of the prior art (for example described in the documents DE 3049272 A1, U.S. Pat. No. 5,589,526 and U.S. Pat. No. 4,342, 844). For this reason, it is of great use in the crosslinking of transparent polymers.

Advantageously, the weight-average molecular weight is within the range extending from 10 000 to 100 000 g/mol, preferably from 20 000 to 65 000 g/mol and very preferably from 25 000 to 50 000 g/mol.

The measurement of the weight-average molecular weight can be determined by Gas Chromatography (GPC) at 145° C. by placing the polymer in trichlorobenzene at a concentration of 1 g/l and by using the Mark-Houwink method for the calculation of the equivalent molar masses (PS calibration).

Preferably, the ethylenic monomer carrying a polar functional group comprises from 3 to 20 carbon atoms and preferably from 4 to 8 atoms.

Advantageously, the ethylenic monomer carrying a polar functional group is chosen from saturated carboxylic acid vinyl esters, unsaturated carboxylic acids or unsaturated carboxylic acid (meth)acrylic esters.

Advantageously, this composition is used for the manufacture of parts or of films of transparent crosslinked polymers. By way of example, these crosslinked transparent polymers are of use in the manufacture of laminated glass or in photovoltaic panels for coating photovoltaic sensors.

The transparent polymer crosslinked by the composition can be chosen from the copolymers of ethylene and of an ethylenic monomer carrying a polar functional group, said ethylenic monomer preferably being chosen from saturated carboxylic acid vinyl esters, unsaturated carboxylic acids or unsaturated carboxylic acid (meth)acrylic esters. Preferably, the ethylenic monomer can be chosen from vinyl acetate and methyl, ethyl or butyl (meth)acrylates.

The composition can be manufactured by the manufacturing processes known to a person skilled in the art, preferably by absorption of the peroxide (b) into the copolymer (a), and the composition is in particular capable of being obtained by the process below.

The invention also relates to a process for the manufacture of a thermoplastic composition of use as masterbatch, comprising:
  a copolymer (a) of ethylene and of an ethylenic monomer carrying a polar functional group in the form of particles;
  a and at least one solution of organic peroxide (b) which is absorbed by said copolymer;
characterized in that the process comprises:
  a first stage in which the solution of peroxide (b) is brought into contact with the copolymer (a);
  a second stage of complete absorption of the solution of peroxide (b) by the copolymer (a) with stirring;
  a third stage of recovery of the thermoplastic composition (I).

An advantage of this process is that the phenomenon of premature crosslinking of the thermoplastic composition is limited and that the manufacturing process is simple.

According to an advantageous form, the temperature of the second stage of the process is below the softening temperature of the copolymer, which is measured in the present patent application by the method described in the standard ASTM E 28-99 (2004), better known under the name "ring and ball".

According to a first advantageous form, the copolymer is in the form of particles having a mean volume of 1 to 1000 mm$^3$, preferably of 3 to 120 mm$^3$.

In this case, the composition is obtained directly in the form of particles without having to reshape the particles. It can then be easily used as masterbatch. By using particles having this specific volume, the absorption of the peroxide by the copolymer is excellent and little agglomeration is observed between the particles.

The copolymer of use in the three-stage process can comprise from 10 to 60% by weight of ethylenic monomer carrying a polar functional group, with respect to the total weight of the copolymer, advantageously from 20 to 45% by weight and very preferably from 25 to 35% by weight.

The absorption of the peroxide is improved when the copolymer comprises this range of ethylenic monomer.

The amount by weight of solution of peroxide (b) included in the composition can be within the range extending from 5 to 30%. According to one form, the amount by weight of peroxide included in the composition is within the range extending from 7 to 16%.

According to one version of the invention, the solution of peroxide (b) is brought into contact with the copolymer (a) on several occasions or continuously, that is to say that there are several injections or one continuous injection of the solution of peroxide (b) during the process.

DETAILED DESCRIPTION OF THE INVENTION

The composition (I) manufactured by the process according to the invention comprises a copolymer (a) and a solution of organic peroxide (b).

The copolymer (a) is a copolymer of ethylene and of an ethylenic monomer carrying a polar functional group.

The term "ethylenic monomer" is understood to mean a monomer comprising an unsaturation capable of reacting with ethylene in a radical process.

The term "polar functional group" is understood to mean a functional group exhibiting a dipole moment, such as the amine, alcohol, urethane, acid or ester functional groups. Preferably, the polar functional group is an acid functional group or an ester functional group.

The ethylenic monomer carrying a polar functional group preferably comprises from 3 to 20 carbon atoms and preferably from 4 to 8 carbon atoms.

Mention may be made, as an example of copolymer (a), of copolymers of ethylene and of a carboxylic acid vinyl ester, copolymers of ethylene and of an unsaturated carboxylic acid or copolymers of ethylene and of an alkyl acrylate or methacrylate, grouped together in the present patent application under the term "alkyl (meth)acrylate". Advantageously, the ethylenic monomer can be chosen from vinyl acetate and methyl, ethyl or butyl (meth)acrylates.

The amount by weight of ethylenic monomer with respect to the total weight of the copolymer (a) can be included in the range extending from 1 to 70%, advantageously from 10 to 60% and preferably from 20 to 45%.

According to the invention, the amounts of the various monomers present in the copolymer (a) can be measured by infrared spectroscopy using the standard ISO 8985 (1998). The softening temperature of the copolymer can be measured by the standard ASTM E 28-99 (2004).

Use may be made of "radical polymerization" processes normally operating at pressures of between 200 and 2 500 bar. These processes are employed industrially using two main types of reactors: a reactor of autoclave type or a reactor of tubular type. These polymerization processes are known to a person skilled in the art and use may be made, for example, of the processes described in the documents FR 2 498 609, FR 2 569 411 and FR 2 569 412. A person skilled in the art knows in what proportions to use each of the monomers in order to obtain the copolymer (a) used in the invention.

These copolymers are sold by the Applicant Company under the Evatane® and Lotryl® brands.

The copolymer can also comprise additives or inorganic fillers. Mention may be made, as an example of additive, of plasticizers, antioxidants or antiozone agents, antistatic agents, coloring materials, pigments, optical brighteners, heat stabilizers, light stabilizers or flame retardants.

Coupling agents can advantageously be added in order to improve the adhesiveness on another support of the composition (I) or of the polymer to be crosslinked. They can be organic, inorganic and more preferably semiinorganic semiorganic. Mention may be made, among them, of titanates or organic silanes, such as, for example, monoalkyl titanates, trichlorosilanes and trialkoxysilanes.

Mention may be made, as inorganic fillers, of clay, silica, talc, carbonates, such as calcium carbonate (chalk), or silicates, such as sodium silicate. The composition advantageously comprises from 0 to 10% by weight of fillers, preferably less than 5% by weight and very preferably less than 1% by weight.

The copolymer (a) is in the form of "particles", that is to say of pieces of polymer which can have any type of geometry, for example spherical, spheroidal or cylindrical. The volume of a particle is advantageously within the range extending from 1 to 1000 $mm^3$, preferably from 3 to 120 $mm^3$. Excellent absorption of the peroxide, while having little agglomeration of the particles, is obtained within these preferred volume ranges. Preferably, at least 90% by weight of these particles have a volume included within these preferred volume ranges.

The solution (b) of organic peroxide comprises at least one organic peroxide with optionally an organic solvent for the latter.

When it is used in the absence of an organic solvent, the organic peroxide has a melting point which is less than or equal to the temperature of the second stage of absorption.

The term "organic peroxide" is understood to mean any hydrocarbon molecule comprising a functional group of the O—O peroxy type.

The organic peroxide can advantageously be chosen from the families of the dialkyl peroxides or peroxyesters.

The organic peroxide is preferably chosen from tert-butyl per-2-ethylhexanoate, di(t-amyl) peroxide, dicumyl peroxide, t-butyl cumyl peroxide, OO-t-butyl O-(2-ethylhexyl) monoperoxycarbonate, OO-t-pentyl O-(2-ethylhexyl) monoperoxycarbonate, OO-t-butyl O-isopropyl monoperoxycarbonate, di(tert-butyl) hydroperoxide, di(tert-amyl) hydroperoxide, 2,5-dimethyl-2,5-di(t-butylperoxy)hexane and 2,2-di(t-amylperoxy)-propane.

Mixtures of these peroxides can be used.

Advantageously, the temperature for a half life for the organic peroxide of one hour is less than or equal to 145° C., preferably from 90 to 140° C.

Use may be made of any type of solvent which is miscible with the peroxide. For example, solvents of alkane, aromatic, alkene, halogenated or alcohol type are used. Preferably, the solvent molecules comprise from 1 to 12 carbon atoms. Mention may be made, as an example of solvent, of decane, dodecane, 2,4,4-trimethylpentene, α-methylstyrene, trichloroethylene, toluene, benzene, ethylbenzene, (1-methylethenyl)-benzene, 2-ethylhexanol, isopropanol, t-butyl alcohol or acetone.

Use may also be made of a mixture of solvents, for example a mixture of the solvents listed above.

Preferably, the amount of solvent is less than or equal to 25% of the total weight of the solution of organic peroxide (b), even less than or equal to 10%.

The solvent used is preferably not a solvent for the copolymer, very particularly when the amount of solvent in the solution of peroxide is greater than 20% by weight. The term "solvent for the copolymer" is understood to mean a concentration of polymer of greater than or equal to 0.05 g per ml of solvent when 1 g of copolymer is brought into contact per ml of solvent at 23° C. for one hour.

The organic peroxides listed above are sold by Arkema under the Luperox® brand.

The composition (1) according to the invention advantageously comprises an amount by weight of peroxide included within the range extending from 5 to 30%, for example from 7 to 16%.

Preferably, the composition is manufactured by absorption of peroxide (b) into the copolymer (a). The absorption process is carried out for as long as necessary in order to obtain the desired content of peroxide (b) in the composition. It can in particular be manufactured by the process which follows.

Another subject matter of the invention is a process for the manufacture of a composition of use as masterbatch which comprises the following stages:
- a first stage in which the solution of peroxide (b) is brought into contact with the copolymer (a);
- a second stage of complete absorption of the solution of peroxide (b) by the copolymer (a);
- a third stage of recovery of the thermoplastic composition.

The first stage of bringing into contact can be carried out in any type of receptacle. The receptacle can be left open or can be closed after the contacting operation. The receptacle can be closed in a leaktight or nonleaktight manner. Preferably, the receptacle is closed in a leaktight manner and is equipped with a valve.

The solution of peroxide (b) is brought into contact with the copolymer (a) by pouting it directly onto the particles or by a dropwise system or by an atomization system, such as a spray.

The second stage is a stage of absorption, with stirring, of the solution of peroxide (b) by the copolymer (a). It is a complete absorption. The term "complete absorption" is understood to mean that the volume of nonabsorbed solution of peroxide (b) remaining in the receptacle after the absorption stage is less than 5%, preferably less than 2% and very preferably less than 1%.

The absorption stage is carried out at a temperature at which the solution of peroxide (b) remains liquid, that is to say at a temperature greater than or equal to the melting point of the peroxide when the latter is used without solvent.

However, it is advantageous for the absorption temperature to be less than the softening temperature of the copolymer (a) measured according to the standard ASTM E 28-99 (2004).

The duration of the absorption is at least up to the complete absorption of the peroxide. The absorption time is generally included within the range extending from 10 to 600 minutes, preferably from 20 to 240 minutes.

The absorption stage is carried out with stirring. This stirring can be carried out by any stirring system, such as, for example, a paddle, propeller, screw or ultrasound system or in a device of rotary or drum type, such as a dryer.

It is possible to carry out several operations in which the solution of peroxide (b) is brought into contact with the copolymer (a), that is to say that the process can comprise at least 2 injections of peroxide. It is also possible to carry out the first and the second stages of the process according to the invention simultaneously by bringing the solution of peroxide (b) into contact continuously with the copolymer (a), for example by a dropwise system or by an atomization system, such as a spray.

During the third stage of the process, the thermoplastic composition is recovered in the form of copolymer particles comprising the peroxide.

Optionally, a stage of drying the particles recovered during the third stage can be carried out, for example in an oven or any other type of dryer. This is carried out at a temperature below the decomposition temperature of the peroxide of the composition.

The thermoplastic composition can be used to crosslink a polymer. Mention may be made, as an example of polymer, of polydienes, such as polybutadiene. Mention may also be made of polyolefins, such as ethylene or propylene homopolymers or ethylene or propylene copolymers. Mention may be made, as an example of ethylene copolymer, of copolymers of ethylene and of an α-olefin, such as propylene, 1-butene, 1-hexene or 1-octene. Mention may also be made, as polymer to be crosslinked, of the copolymers (a) of ethylene and of an ethylenic monomer carrying a polar functional group described above.

According to one embodiment, the copolymer (a) is a copolymer of ethylene and of vinyl acetate and the polymer to be crosslinked is a copolymer of ethylene and of vinyl acetate. In order to crosslink the polymer, it is generally blended in a first stage with the thermoplastic composition comprising (a) and (b), a second stage of shaping the polymer and then the polymer is crosslinked in a third stage.

During the first stage, conventional blending techniques are used, in particular in devices for processing thermoplastics, such as extruders or mixers. Blending can be carried out at a temperature below the decomposition temperature of the peroxide (b).

The second stage of shaping is carried out at a temperature below the decomposition temperature of the peroxide (b). Use may be made of any type of equipment which makes possible shaping, such as presses, injection molding machines or calenders. The shaping can also be carried out simultaneously with the first stage, for example by film extrusion, a flat die being placed at the end of the extruder.

The third stage is generally carried out at a temperature greater than the decomposition temperature of the peroxide.

The thermoplastic composition (I) is advantageously used to crosslink polymers in the manufacture of transparent parts or films.

According to the invention, a part or a film is transparent when it exhibits a level of haze of less than or equal to 20%, for example of less than or equal to 10%. The level of haze of the film is valued according to the standard ASTM D1003, on a film of a thickness of 500 μm of the composition of which the part or film is composed, and for at least one wavelength in the visible region (from 380 to 780 nm), for example 500 nm.

The invention is now illustrated without implied limitation by the following examples.

EXAMPLES

Products Used:

EVA 1: copolymer of ethylene and of vinyl acetate comprising 33% by weight of vinyl acetate. The melt flow index is 45 g/10 min (190° C., 2.16 kg, ASTM D 1238). The weight-average molecular weight ($M_w$) is 62 000 g/mol.

EVA 2: copolymer of ethylene and of vinyl acetate comprising 28% by weight of vinyl acetate. The melt flow index is 5 g/10 min (190° C., 2.16 kg, ASTM D 1238). $M_w$ is 87 000 g/mol.

EVA 3: copolymer of ethylene and of vinyl acetate comprising 28% by weight of vinyl acetate. The melt flow index is 25 g/10 min (190° C., 2.16 kg, ASTM D 1238). $M_w$ is 61 500 g/mol.

EVA 4: copolymer of ethylene and of vinyl acetate comprising 28% by weight of vinyl acetate. The melt flow index is 1.50 g/10 min (190° C., 2.16 kg, ASTM D 1238). $M_w$ is 41 000 g/mol.

EVA 5: copolymer of ethylene and of vinyl acetate comprising 28% by weight of vinyl acetate. The melt flow index is 800 g/10 min (190° C., 2.16 kg, ASTM D 1238). $M_w$ is 30 300 g/mol.

EVA 6: copolymer of ethylene and of vinyl acetate comprising 18% by weight of vinyl acetate. The melt flow index is 2 g/10 min (190° C., 2.16 kg, ASTM D 1238).

A first test is carried out using a solution of Luperox® TCS and a second test is carried out using a solution of Luperox® TBEC as organic peroxide solution.

Absorption of the Peroxide by the Copolymer

An absorption is carried out on particles of copolymer EVA 1 for each of the peroxide solutions.

The solution of organic peroxide (2.2 kg) is brought into contact with the copolymer (19.8 kg) in a closed receptacle at 20° C., the axis of rotation of the cylinder being horizontal, and stirred by rotation of the receptacle at a speed of 3 revolutions per minute. A first half of the peroxide solution is injected at the start of the absorption and a second half is added after absorbing for 30 minutes.

For the solution of Luperox® TCS, the polymer particles are recovered after 180 minutes. All the peroxide solution is absorbed into the particles.

For the solution of Luperox® TBEC, the polymer particles are recovered after 120 minutes. All the peroxide solution is absorbed into the particles.

The particles were quantitatively determined after washing in n-heptane for one hour: the amount of peroxide in the copolymer is 10% by total weight of the composition.

Effect of the Content of Ethylenic Monomer in the Copolymer (a) on its Kinetics of Absorption of Peroxide (b)

The device used above is used again in bringing Luperox® TBEC into contact with the copolymer (8% by weight of peroxide) and the time necessary for the absorption of the peroxide is measured. The time necessary for the complete absorption of the peroxide into the ethylene/vinyl acetate copolymer is presented in table 1.

Characteristics of the Masterbatch: Transparency

Films with a thickness of 500 μm of the various masterbatches are prepared by low-temperature pressing (85° C.). The transparency of these various films is evaluated with the naked eye (a very transparent composition is evaluated "+" and a hazy composition is evaluated "−") and given in table 1.

| | EVA | | | | |
|---|---|---|---|---|---|
| | 2 | 3 | 4 | 5 | 6 |
| Kinetics (min) | 285 | 180 | 90 | 45 | >360 |
| Transparency | + | + | + | + | − |

It is noticed that the kinetics of absorption of the peroxide increase with the content of vinyl acetate. It is also noticed that the rate of absorption increases when the weight-average molecular weight of the copolymer decreases.

Surprisingly, the masterbatch compositions according to the invention can be easily manufactured, even by simple absorption of the peroxide into the copolymer.

Furthermore, the masterbatches according to the invention are particularly transparent.

The invention claimed is:

1. A process for the manufacture of a thermoplastic composition comprising a) a copolymer of ethylene and vinyl acetate, wherein the copolymer is in the form of particles and b) at least one solution of at least one organic peroxide which is absorbed by the copolymer, wherein the at least one organic peroxide is selected from the group consisting of OO-t-butyl O-(2-ethylhexyl) monoperoxycarbonate, OO-t-pentyl O-(2-ethylhexyl) monoperoxycarbonate, and mixtures thereof and wherein the process comprises:
  i) a first stage of bringing the solution of organic peroxide into contact with the copolymer;
  ii) a second stage of completely absorbing the solution of organic peroxide into the copolymer, wherein the second stage is carried out with stirring; and
  iii) a third stage of recovering the thermoplastic composition;
  wherein the recovered thermoplastic composition is transparent.

2. The process of claim 1, wherein the temperature during the second stage is below the softening temperature of the copolymer measured according to ASTM E 28-99 (2004).

3. The process of claim 1, wherein the copolymer in the form of particles has a volume of 1 to 1000 $mm^3$.

4. The process of claim 1, wherein the copolymer comprises from 10 to 60% by weight, with respect to the total weight of the copolymer, of vinyl acetate.

5. The process of claim 1, wherein the amount by weight of the solution of organic peroxide in the composition is from 5 to 30%.

6. The process of claim 1, wherein the amount by weight of the solution of organic peroxide in the composition is from 7 to 16%.

7. The process of claim 1, wherein the solution of organic peroxide is brought into contact with the copolymer on several occasions or continuously.

8. The process of claim 1, additionally comprising a fourth stage of drying the thermoplastic composition recovered in the third stage.

9. The process of claim 1, wherein the solution of at least one organic peroxide is a solution in at least one organic solvent.

10. The process of claim 9, wherein the organic solvent is not a solvent for the copolymer.

* * * * *